US011926161B2

(12) United States Patent
Hitzlsperger et al.

(10) Patent No.: US 11,926,161 B2
(45) Date of Patent: Mar. 12, 2024

(54) MODULAR PRINTING BAR FOR AN INKJET PRINTING DEVICE

(71) Applicant: Canon Production Printing Holding B.V., Hh Venlo (NL)

(72) Inventors: Florian Hitzlsperger, Munich (DE); Ulrich Stöckle, Munich (DE)

(73) Assignee: Canon Production Printing Holding B.V., Venlo (NL)

( * ) Notice: Subject to any disclaimer, the term of this patent is extended or adjusted under 35 U.S.C. 154(b) by 139 days.

(21) Appl. No.: 17/577,969

(22) Filed: Jan. 18, 2022

(65) Prior Publication Data

US 2022/0234360 A1 Jul. 28, 2022

(30) Foreign Application Priority Data

Jan. 22, 2021 (DE) ..................... 10 2021 101 307.0

(51) Int. Cl.

*B41J 2/17* (2006.01)
*B41J 2/175* (2006.01)
*B41J 29/377* (2006.01)

(52) U.S. Cl.

CPC ............. *B41J 2/1707* (2013.01); *B41J 2/175* (2013.01); *B41J 29/377* (2013.01)

(58) Field of Classification Search

CPC ........ B41J 29/377; B41J 2/1707; B41J 2/175; B41J 2/18; B41J 2202/20

See application file for complete search history.

(56) References Cited

U.S. PATENT DOCUMENTS

| | | | | |
|---|---|---|---|---|
| 6,637,858 | B2 | 10/2003 | Wotton et al. | |
| 6,824,245 | B2 * | 11/2004 | Silverbrook | B41J 2/14<br>347/42 |
| 10,239,321 | B2 * | 3/2019 | Imamura | B41J 2/16 |
| 2005/0243127 | A1 | 11/2005 | Higginson et al. | |
| 2005/0243146 | A1 | 11/2005 | Essen et al. | |
| 2013/0010027 | A1 | 1/2013 | Yamada et al. | |
| 2015/0035901 | A1 | 2/2015 | Obata | |
| 2016/0039204 | A1 | 2/2016 | Matsui | |
| 2020/0114649 | A1 * | 4/2020 | Hitzlsperger | B41J 2/16535 |

OTHER PUBLICATIONS

German Search Report dated Sep. 30, 2021, Application No. 10 2021 101 307.0.

* cited by examiner

*Primary Examiner* — An H Do

(74) *Attorney, Agent, or Firm* — The Webb Law Firm

(57) ABSTRACT

A modular print bar may include at least one first print head module and at least one second print head module. Each print head module may include a base plate with which at least one print head can be connected. At least one first ink supply line for supplying ink to the respective print head may respectively run in the base plates. The print head modules may be firmly connected to a print bar such that a connection can be established between the first ink supply line of the first print head module and the first ink supply line of the second print head module.

15 Claims, 7 Drawing Sheets

MODULAR PRINTING BAR FOR AN INKJET PRINTING DEVICE

CROSS REFERENCE TO RELATED APPLICATIONS

This patent application claims priority to German Patent Application No. 102021101307.0, filed Jan. 22, 2021, which is incorporated herein by reference in its entirety.

BACKGROUND

Field

The disclosure relates to a modular print bar for an inkjet printing device, having at least one first print head module and at least one second print head module, wherein each print head module comprises a base plate with which at least one print head can be connected.

Related Art

Print bars for inkjet printing systems are typically constructed for a predetermined number of print heads, in particular for five, ten, or fifteen print heads. Given a variation of the number and/or the type of the print heads, a new print bar must normally be constructed.

From the document U.S. Pat. No. 6,637,858 B2, an inkjet printing unit is known in which a plurality of printing modules can be combined with one another, wherein each printing module comprises a plurality of print heads, so that a certain flexibility is achieved in the design of the print bar. However, how the supplying of the print heads with ink within the printing modules takes place is not known from the cited prior art.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
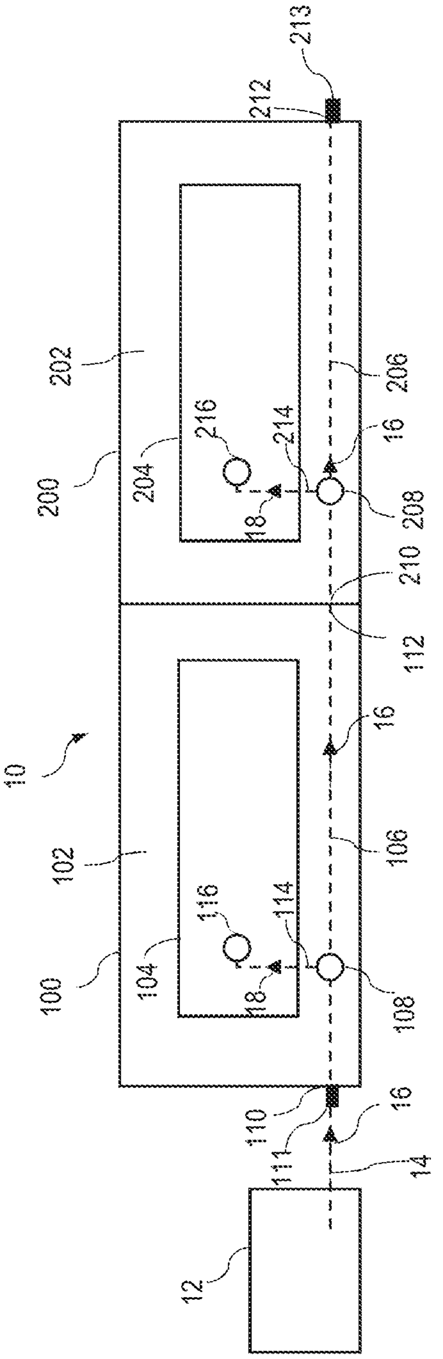
Figure 2:
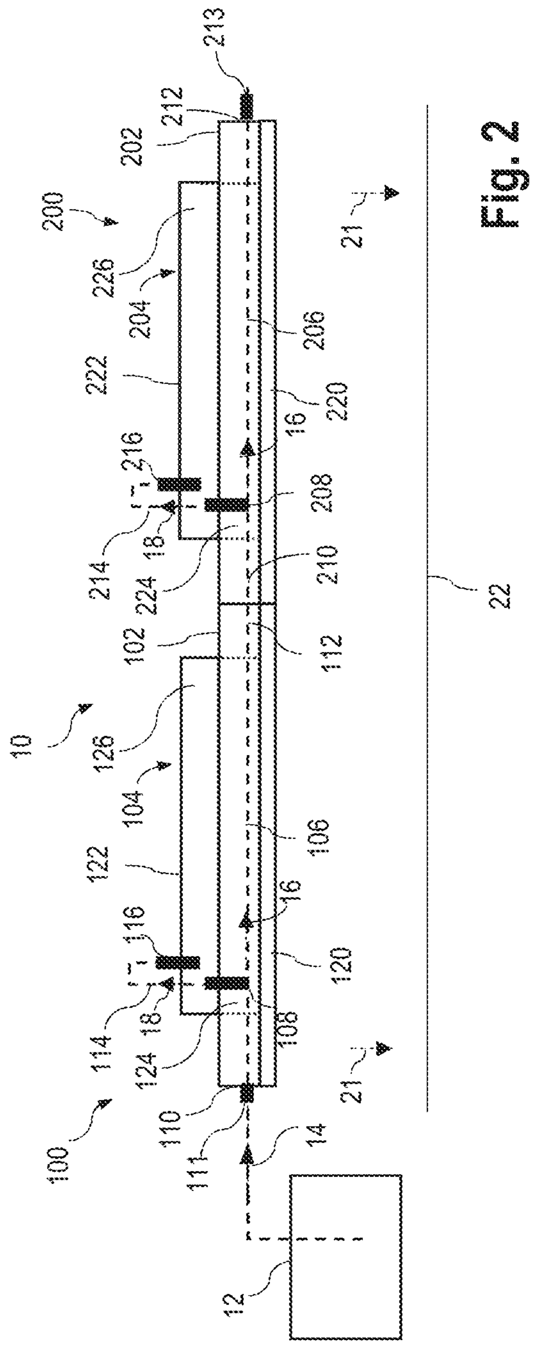
Figure 3:
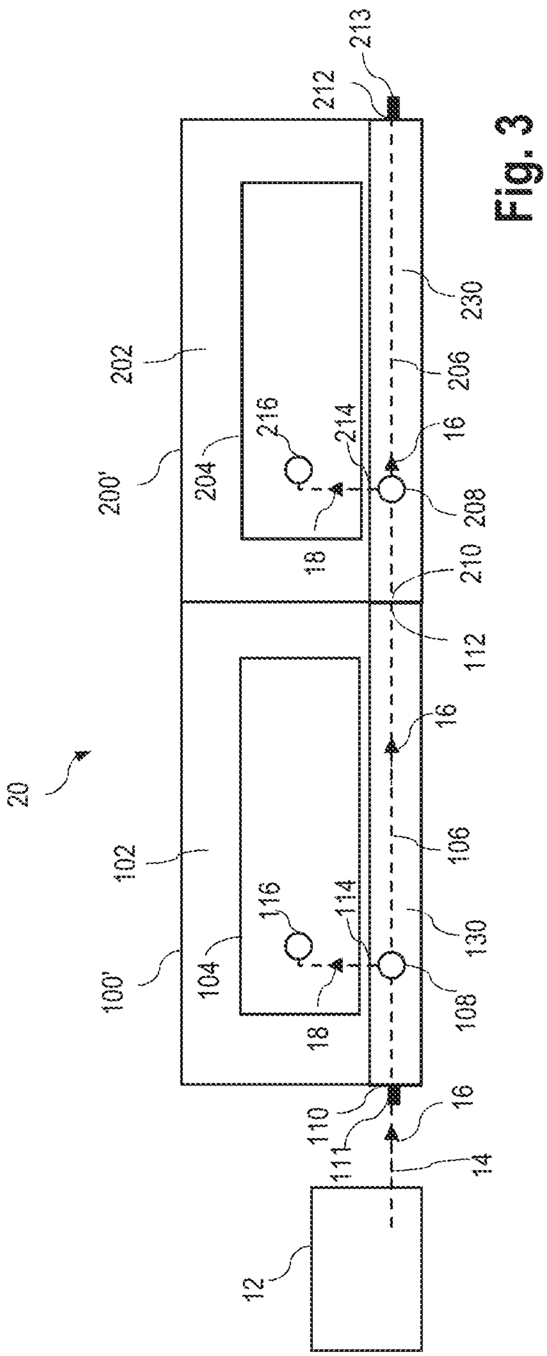
Figure 5:
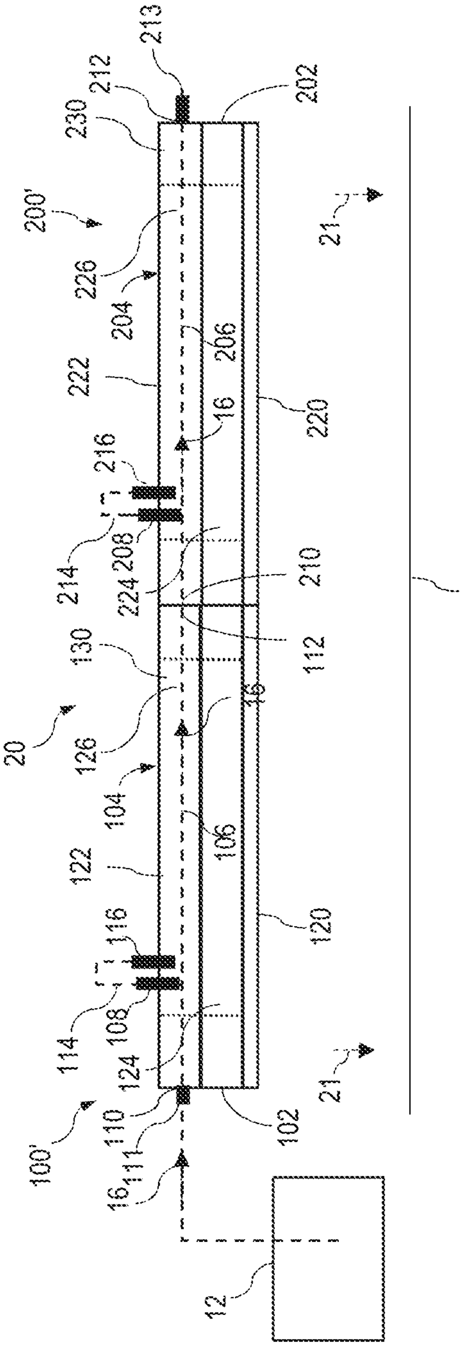
Figure 4:
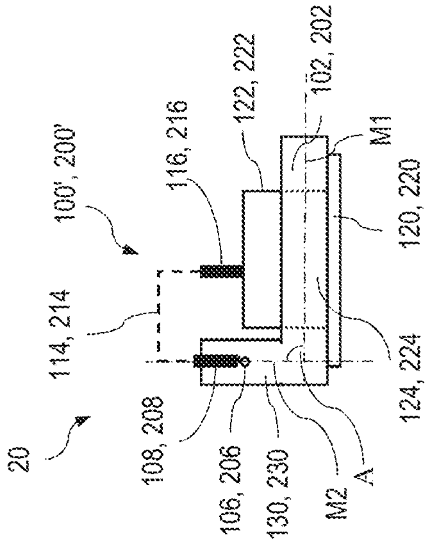
Figure 6:
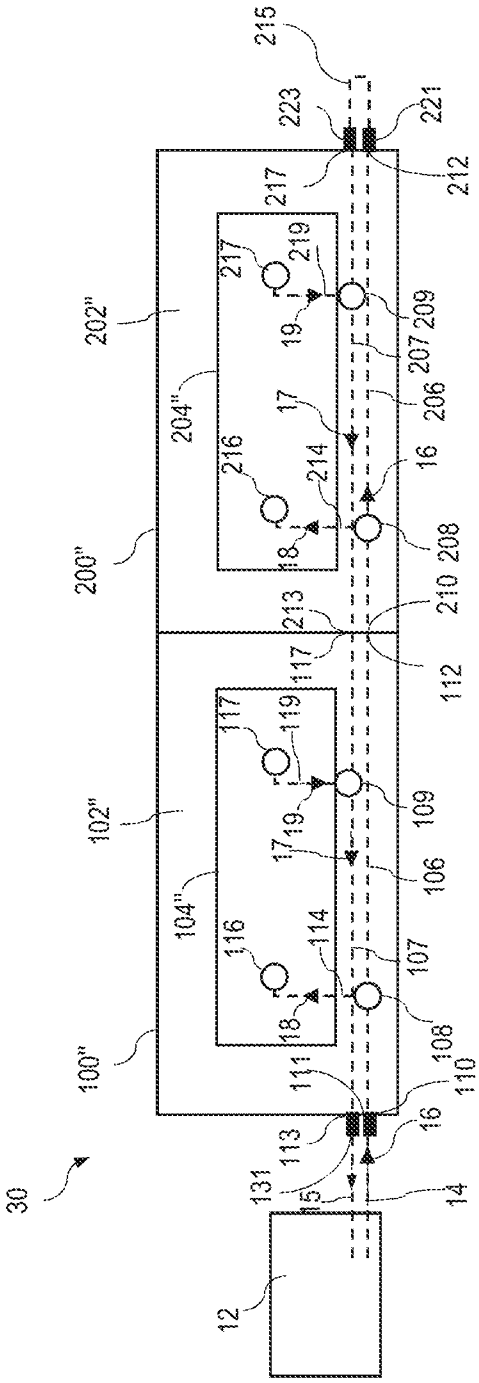
Figure 7:
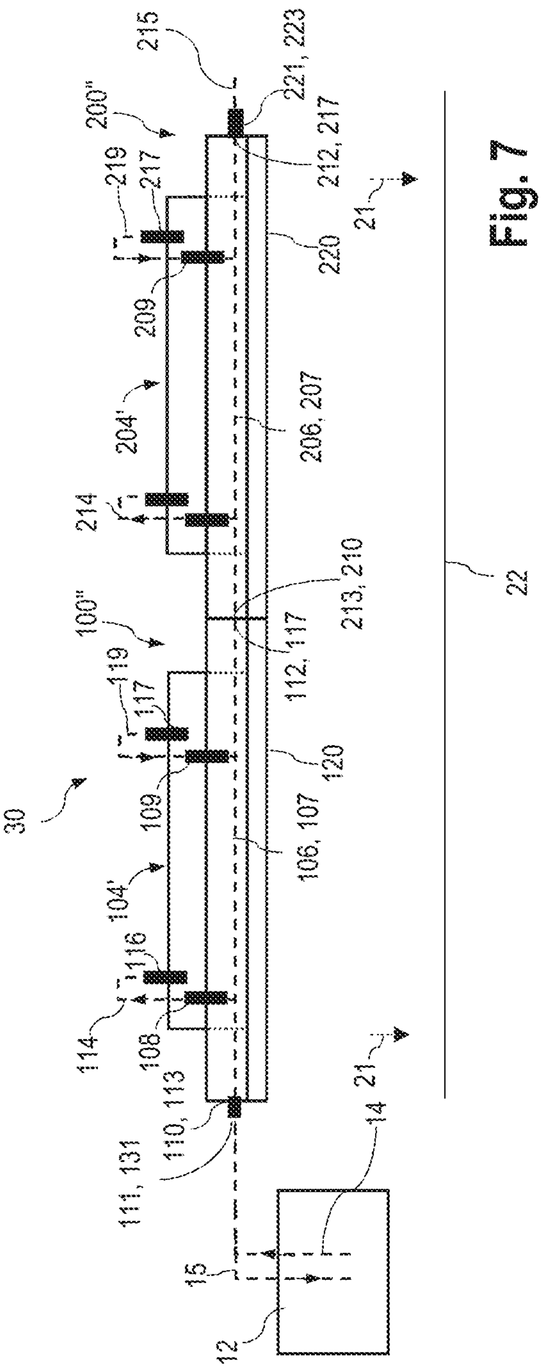
Figure 8:
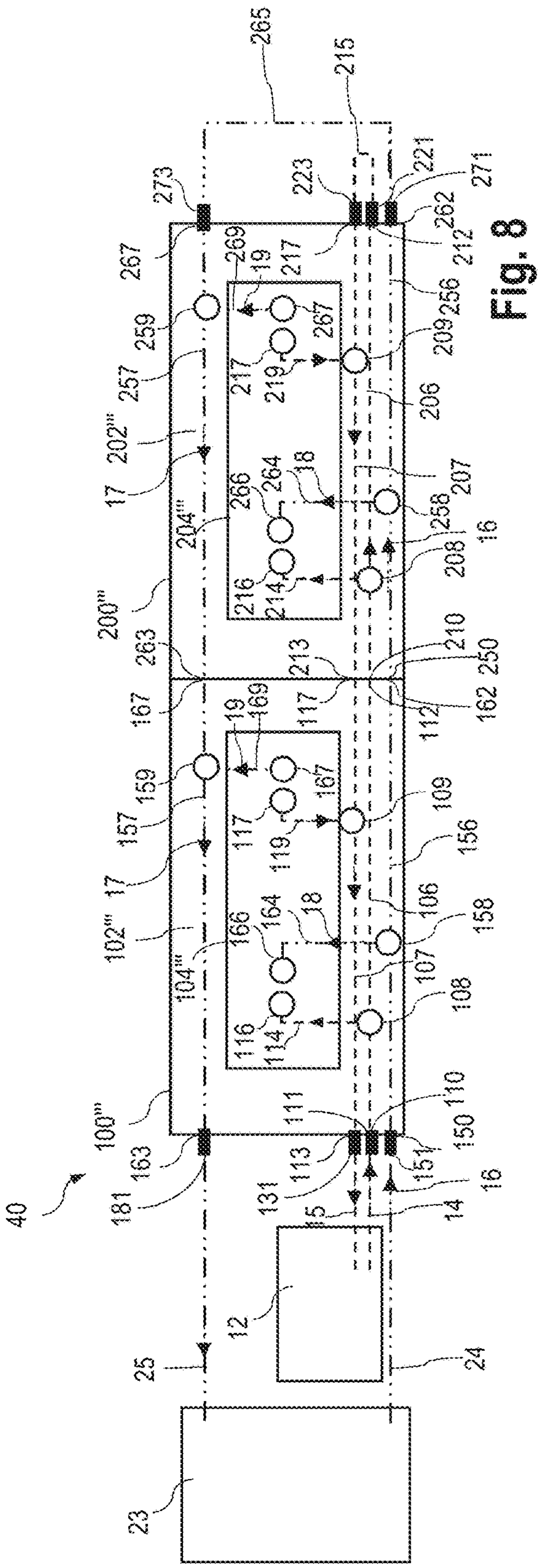
Figure 9:
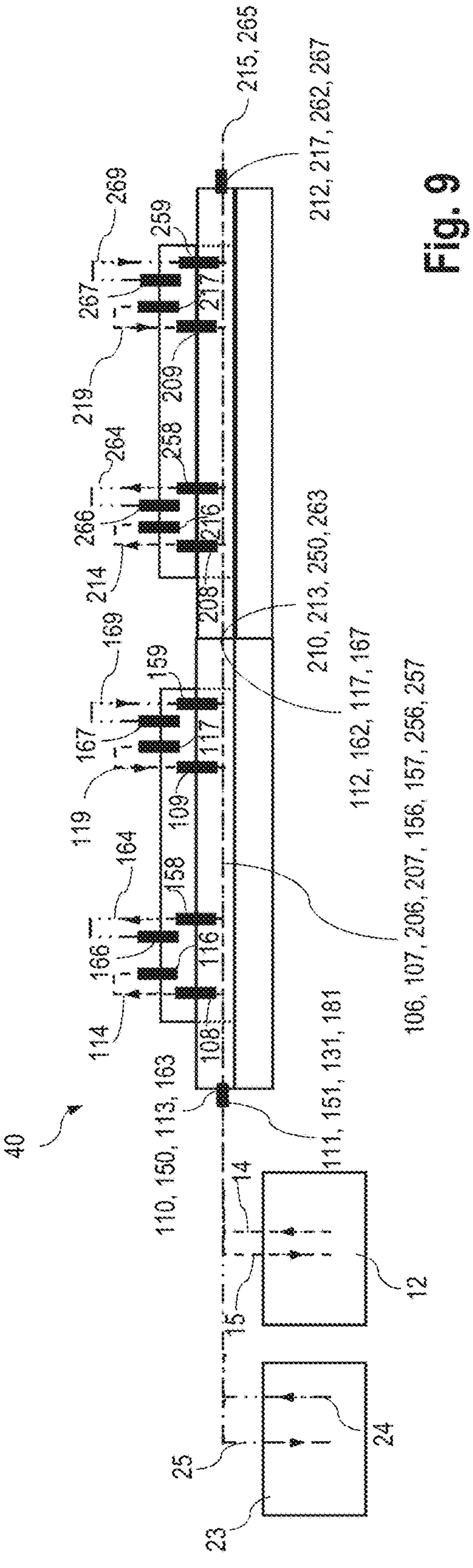
Figure 10:
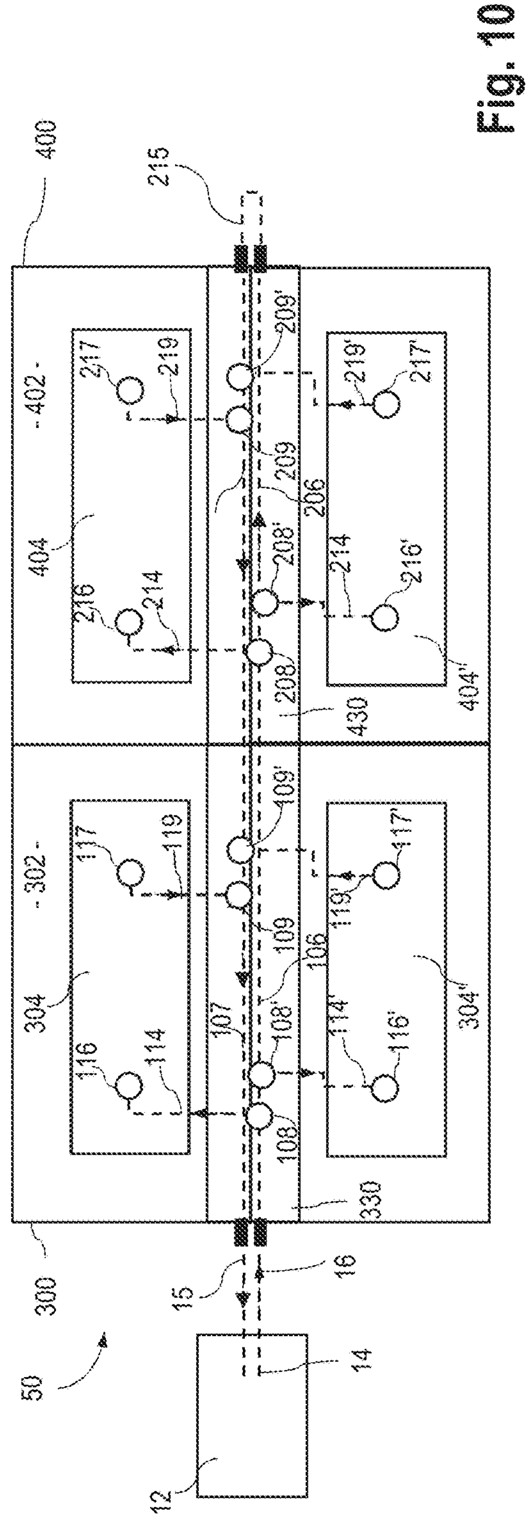
Figure 11:
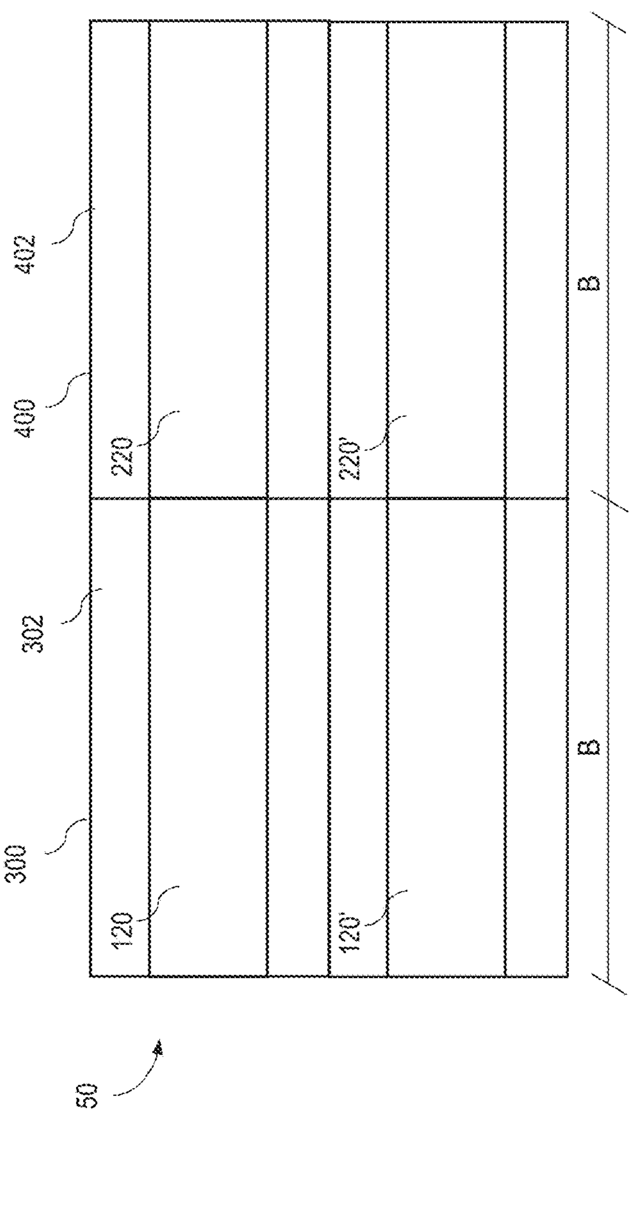
Figure 12:
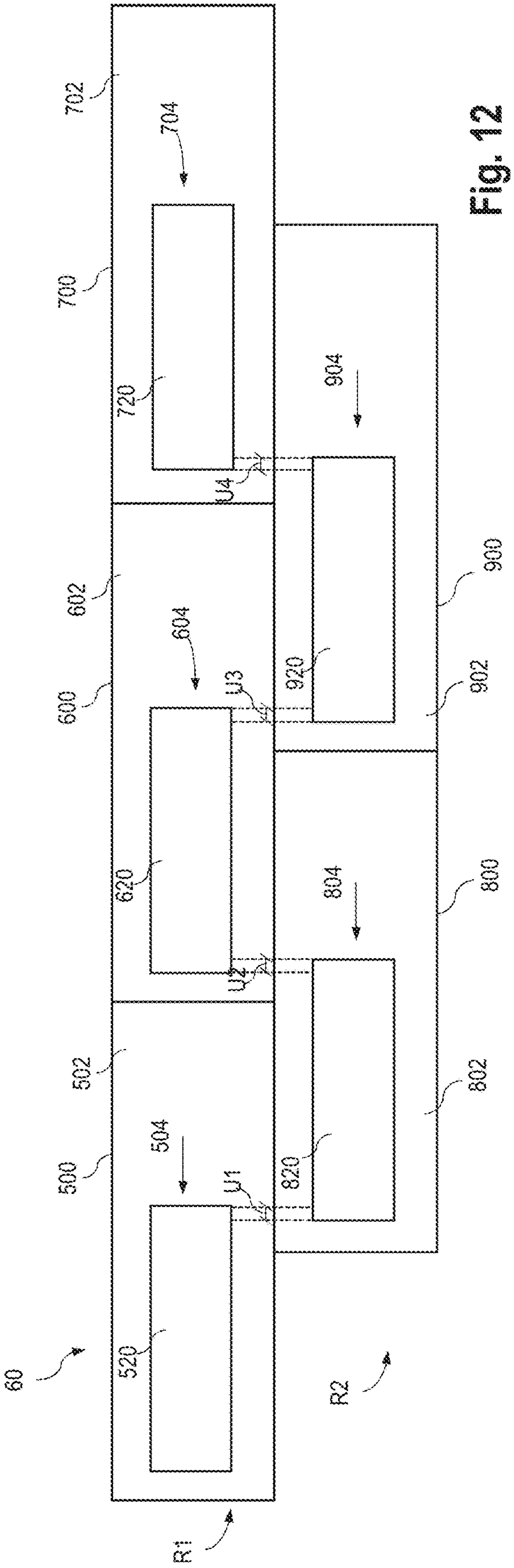
Figure 13:
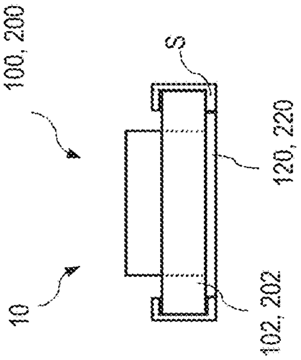

FIG. 1 a schematic plan view of a print bar having two print head modules according to a first embodiment, FIG. 2 a schematic side view of the print bar according to FIG. 1, FIG. 3 a schematic plan view of a print bar having two print head modules according to a second embodiment, FIG. 4 a first schematic front view of the print bar according to FIG. 3, FIG. 5 a second schematic side view of the print bar according to FIG. 3, FIG. 6 a schematic plan view of a print bar having two print head modules according to a third embodiment, FIG. 7 a schematic side view of the print bar according to FIG. 6, FIG. 8 a schematic plan view of a print bar having two print head modules according to a fourth embodiment, FIG. 9 a schematic side view of the print bar according to FIG. 8, FIG. 10 a schematic plan view of a print bar having two print head modules according to a fifth embodiment, FIG. 11 a bottom schematic view of the print bar according to FIG. 10, FIG. 12 a bottom schematic view of a print bar having five print head modules arranged with an offset according to a sixth embodiment, and FIG. 13 a seventh embodiment in which the print bar according to FIG. 1 is introduced into a rail.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

It is the object of the disclosure to specify a modular print bar that has an especially compact and flexible design and ensures a simple supplying of the print heads with ink.

In an exemplary embodiment, the first print head module and the second print head module respectively comprise at least one first ink supply line running in the base plate to supply ink to the respective print head. The first print head module and the second print head module can be firmly connected to the print bar such that a connection can be established between the first ink supply line of the first print head module and the first ink supply line of the second print head module. An especially compact design of the print bar is thereby achieved.

In an exemplary embodiment, the first print head module comprises a first carrier element and the second print head module comprises a second carrier element. The center planes of the carrier elements are respectively arranged at an angle to the center planes of the respective base plate, wherein the angle is preferably 90°. In the first carrier element and in the second carrier element, a first ink supply line respectively runs for supplying ink to the respective print head. The first print head module and the second print head module can be firmly connected to the print bar such that a connection can be established between the first ink supply line of the first print head module and the first ink supply line of the second print head module. An especially simple and stable design of the print bar is thereby achieved.

In the achievements known from the prior art, the ink to be supplied to the print jobs is pre-tempered in a heat exchanger and/or with the aid of a heating element so that it exhibits desired properties during the printing process, for example a predetermined viscosity. The temperature of the print heads in the print bar must also be regulated, since dissipation loss in the form of heat is generated and emitted during the processing of the print data. In the achievements known from the prior art, the cooling of the heads and the tempering of the ink take place independently of one another.

In one or more exemplary embodiments, coolant supply lines travel closely and/or parallel to the ink supply lines, such that the ink supplied in the ink supply lines can be tempered with the aid of coolant directed in the coolant supply lines. It is thereby achieved that the ink and the print heads are tempered in an especially simple manner.

FIG. 1 shows a schematic plan view of a print bar 10 having a first print head module 100 and having a second print head module 200, according to a first embodiment. The first print head module 100 and the second print head module 200 are firmly connected with one another via a material bond, in particular an adhesive bond. Each print head module 100, 200 comprises a base plate 102, 202 that is respectively connected with a print head 104, 204. The connection of the base plates 102, 202 with the respective print head 104, 204 takes place with the aid of a mount (not shown) in which the respective print head 104, 204 is accommodated so as to be swappable.

An ink supply line 106, 206 for supplying ink to the respective print heads 104, 204 is respectively integrated into the base plates 102, 202. The ink supply lines 106, 206 travel in cutouts of the base plates 102, 202. The cutouts may in particular be produced via bores. The ink supply line 106 travels between a first opening 110 of the base plate 102 and a second opening 112 of the base plate 102. The ink supply line 206 travels between a first opening 210 of the base plate 202 and a second opening 212 of the base plate 202.

A hose fitting 111 is arranged at the first opening 110 of the base plate 102, in particular is glued or screwed to the base plate 102. The ink supply line 106 is connected to an external ink supply line 14 via the hose fitting 111. The ink supply line 106 supplies ink in the arrow direction 16 from an ink supply unit 12, via the external ink supply line 14. Via a connector 108 of the first print head module 100, ink is conveyed from an ink outlet opening of the ink supply line 106 into a connecting hose 114 that is connected with a connector 116 of the print head 104 accommodated in the first print head module 100, so that ink is supplied in the arrow direction 18 from the ink supply line 106 to the first print head 104.

The second opening 112 of the base plate 102 of the first print head module 100 adjoins the first opening 210 of the base plate 202 of the second print head module 200. Via the openings 112, 210, a connection is established between the ink supply line 106 of the first print head module 100 and the ink supply line 206 of the second print head module 200. The two base plates 102, 202 are connected with one another such that the ink supply lines 106, 206 form a continuous ink supply line. By connecting the two ink supply lines 106, 206, ink is supplied in the arrow direction 16 from the ink supply line 106 of the first print head module 100 to the ink supply line 206 of the second print head module 200.

Via a connector 208 of the second print head module 200, ink is conveyed from an ink outlet opening of the ink supply line 206 into a connecting hose 214 that is connected with a connector 216 of the print head 204 accommodated in the second print head module 200, such that ink is supplied in the arrow direction 18 from the ink supply line 206 to the second print head 204. In an exemplary embodiment, the connectors 108, 116, 208, 216 are executed as hose fittings for the connection of a connecting line 114, 214, wherein the hose fittings in the base plate 102, 202 are screwed in, inserted, welded onto the base plate 102, 202, or soldered onto the base plate 102, 202. The connecting line 114, 214 may in particular be executed as a connecting hose. In the described first exemplary embodiment, the ink supply line 206 is closed with a closure element 213 at the second opening 212.

FIG. 2 shows a schematic side view of the print bar 10 according to FIG. 1. Elements having the same design or the same function have the same reference character. The first print head 104 and the second print head 204 respectively comprise a print nozzle region 120, 220 and a supply region 122, 222. A respective ink chamber (not shown) is arranged in the supply region 122, 222, which ink chamber is filled with ink or refilled with fresh ink via the connecting hose 114, 214. In the print nozzle region 120, 220, print nozzles are arranged which comprise nozzle channels via which ink is ejected in the form of ink droplets. A respective actuator is arranged in the ink chamber or in the nozzle channel of the print head 104, 204 to generate an ink droplet. The actuator is controlled by an actuator controller, depending on print data, with a control signal having a predetermined waveform to output an ink droplet, such that an ink droplet is ejected in the arrow direction 21 and a print dot is generated on a recording medium 22.

In the first embodiment, the print nozzle region 120, 220 respectively extends along the entire width of the respective print head modules 100, 200 and protrudes from the base plate 102, 202 in the arrow direction 21. The supply region 122, 222 of the print heads 104, 204 respectively has a smaller width than the respective print head module 100, 200. A first region 124, 224 of the supply region 122, 222 is accommodated in the respective base plate 102, 220; a second region 126, 226 of the supply region 122, 222 protrudes from the respective print head module 100, 200 in the direction opposite the arrow direction 21. The print nozzle regions 120, 220 are immediately adjoining one another. The adjacent print nozzles of the print nozzle region 120 and of the print nozzle region 220 are in particular aligned such that they are aligned in the print raster of the raster images to be printed.

FIG. 3 shows a schematic plan view of a print bar 20 having two print head modules 100', 200' according to a second embodiment. Elements having the same design or the same function have the same reference characters. The first print head module 100' comprises a first carrier element 130, the second print head module 200' comprises a second carrier element 230. In contrast to the first embodiment, the ink supply line 106 does not run in the base plate 102 but rather in a cutout of the first carrier element 130. The ink supply line 206 accordingly also does not run in the base plate 202 but rather in a cutout of the second carrier element 230. An especially good stability of the print head modules 100', 200' is achieved with the aid of the carrier elements 130, 230. The carrier elements 130, 230 are connected among one another in the same manner as the base plates 102, 202, in particular are glued with one another.

FIG. 4 shows a schematic front view of the print bar 20 according to FIG. 3, from a first side. The carrier elements 130, 230 are respectively arranged such that the middle lines M2 of the carrier elements 130, 230 and the middle lines M1 of the base plates 102, 202 form a 90° angle, so that the carrier elements 130, 230 and the base plates 102, 202 form the shape of an L profile. In the exemplary embodiment according to FIG. 4, the carrier elements 130, 230 and the respective base plates 102, 202 are formed as a single piece. Given alternative embodiments, the carrier elements 130, 230 and the respective base plates 102, 202 are separate components firmly connected with one another. In further embodiments, the carrier elements 130, 230 together with the base plates 102, 202 form a T-shaped cross section.

FIG. 5 shows a further schematic side view of the print bar 20 according to FIG. 3, from a second side.

FIG. 6 shows a schematic plan view of a print bar 30 having two print head modules 100", 200" according to a third embodiment. The print head modules 100", 200" differ from the print head modules 100, 200 of the first embodiment in that, in addition to the ink supply lines 106, 206 for supplying ink to the respective print heads 104", 204", a respective additional ink supply line 107, 207 for discharging ink from the respective print heads 104", 204" is integrated into the base plates 102", 202". The ink supply lines 106, 206 are referred to in the following as first ink supply lines; the ink supply lines 107, 207 are referred to in the following as second ink supply lines.

The supplying of the print heads 104', 204' with ink takes place in the same manner as is described in conjunction with FIG. 1. The first ink supply line 206 is, however, not closed at the second opening 212. A hose fitting 221 is arranged at the second opening 212, in particular is glued or screwed to the base plate 202', which connects the first ink supply line 206 with a first end of a hose connection element 215.

The base plates 102", 202" respectively comprise a third opening 113, 213 and a fourth opening 117, 217, wherein the second ink supply line 107 for discharging ink travels between the third opening 113 and the fourth opening 117 of the base plate 102" of the first print head module 100", and the second ink supply line 207 for discharging ink travels between the third opening 213 and the fourth opening 217 of the second print head module 200". A hose fitting 223 is arranged at the fourth opening 217 of the second print head module 200", in particular is glued or screwed to the base plate 102", which hose fitting 223 connects the second ink supply line 217 with a second end of the hose connection element 215. In other embodiments, the second opening 212 and the fourth opening 217 are respectively closed by a closure element.

In addition to the connector 216, which is a first connector 216 of the print head 204", the print head 204" comprises a second connector 217. In addition to the connector 208, which is a first connector 208 of the print head module 200", the second print head module 200" also comprises a second connector 209. Via the second connector 217 of the print head 204", ink is conveyed in a connecting hose 219 that is connected with the second connector 209 of the print head module 200" so that ink may flow in the arrow direction 19 from the print head 204" into the second ink supply line 207 via an ink inlet opening.

The third opening 213 of the base plate 202 of the second print head module 200" adjoins the fourth opening 117 of the base plate 101 of the first print head module 100". A connection between the second ink supply line 207 of the second print head module 200" and the second ink supply line 107 of the first print head module 100" is established via the openings 213, 117. In an exemplary embodiment, the base plates 102", 202" are glued to one another so that the ink supply lines 107, 207 form a continuous ink supply line. Ink is thus supplied in the arrow direction 17 from the second ink supply line 207 of the second print head module 200" to the second ink supply line 107 of the first print head module 100".

In addition to the connector 116, which is a first connector 116 of the print head 104", the print head 104" comprises a second connector 117. In addition to the connector 108, which is a first connector 108 of the first print head module 100", the first print head module 100" also comprises a second connector 109. Via the second connector 117 of the print head 104", ink is conveyed in a connecting hose 119 that is connected with the second connector 109 of the print head module 100" so that ink from the print head 104' is directed in the arrow direction into the second ink supply line 107 via an ink inlet opening.

A hose fitting 131 is arranged at the third opening 113 of the first print head module 100", in particular is glued or screwed to the base plate 102", which hose fitting 131 is connected at a first end with the second ink supply line 107 and at a second end with an external ink supply line 15 which connects the print head module 100" with the ink supply unit 12. The ink conveyed from the print heads 104" and 204" is supplied back in the arrow direction 17 into the ink supply unit 12 via the ink supply line 15. Given the described third embodiment, a closed ink circuit is thus formed that ensures the supply of the print heads 104", 204" with fresh ink and the discharge of excess ink from the print heads 104", 204".

FIG. 7 shows a schematic side view of the print bar 30 according to FIG. 6. The first ink supply lines 106, 206 travel in the base plates 102", 202", respectively parallel to the second ink supply lines 107, 207.

FIG. 8 shows a schematic plan view of a print bar 40 having two print head modules 100'", 200'" according to a fourth embodiment. Elements having the same design or the same function have the same reference characters. The supply of the ink to the print heads 104'", 204'" and the discharge of the ink from the print heads 104'", 204'" takes place in the manner described in the third embodiment. In the fourth embodiment, a respective first coolant supply line 156, 256 for supplying coolant to the respective print head 104'", 204'" travels in the base plate 102'" of the first print head module 100'" and in the base plate 202'" of the second print head module 200'". A respective second coolant supply line 156, 256 for discharging coolant from the respective print head 104'", 204'" also travels in the base plate 102'" of the first print head module 100'" and in the base plate 202'" of the second print head module 200'".

The first coolant supply line 156 of the first print head module 100'" travels between a fifth opening 150 and a sixth opening 162 in the base plate 102'". A hose fitting 151 is arranged at the fifth opening 150, in particular is glued or screwed to the base plate 102'", which hose fitting 151 connects the first coolant supply line 156 with an external coolant supply line 24. Coolant is supplied in the arrow direction 16 from a coolant supply unit 23 to the first coolant supply line 156 via the external coolant supply line 24. Via a third connector 158 of the first print head module 100'", coolant is conveyed from a coolant outlet opening of the first coolant supply line 156 into a connecting hose 164 that is connected with a third connector 166 of the print head 104'" so that coolant may flow in the arrow direction 18 into the print head 104'".

The sixth opening 162 of the first print head module 100'" adjoins the fifth opening 250 of the second print head module 200'". A connection between the first coolant supply line 156 of the first print head module 100'" and the first coolant supply line 256 of the second print head module 200'" is established via the openings 162, 250. In an exemplary embodiment, the two base plates 102'", 202'" are glued to one another so that the coolant supply lines 156, 256 form a continuous coolant supply line. Via the connection of the two coolant supply lines 156, 256, coolant is conducted in the arrow direction 16 from the first coolant supply line 156 of the first print head module 100'" into the first coolant supply line 256 of the second print head module 200'".

Via a third connector 258 of the second print head module 200''', coolant is conveyed from a coolant outlet opening into a connecting hose 264, which is connected with a third connector 266 of the print head 204''' so that coolant is supplied in the arrow direction 18 to the print head 204'''.

The first coolant supply line 256 travels between the fifth opening 250 and a sixth opening 262 of the second print head module 200'''. Arranged at the sixth opening 262 is a hose fitting 271 that connects the first coolant supply line 256 with a first end of a hose connection element 265.

The base plates 102''' and 202''' respectively comprise a seventh opening 163, 263 and an eighth opening 167, 267. The second coolant supply lines 157, 257 respectively run between the seventh opening 163, 263 and the eighth opening 167, 267. Arranged at the eighth opening 267 of the second print head module 200''' is a hose fitting 273 that connects the hose connection element 265 with the second coolant supply line 257 of the second print head module 200'''.

The print head 204''' comprises a fourth connector 267 with the aid of which coolant is conveyed from the print head 204''' into a connecting hose 269. The connecting hose 269 is connected with a fourth connector 259 of the second print head module 200''' so that coolant may flow in the arrow direction 19 from the print head 204''' into the coolant supply line 257 via an ink inlet opening.

The seventh opening 263 of the second print head module 200''' adjoins the eighth opening 167 of the first print head module 100'''. A connection between the second coolant supply lines 157, 257 is established via the openings 167, 263. In an exemplary embodiment, with the base plates 102''', 202''' being glued to one another, the coolant supply lines 157, 257 form a continuous coolant supply line. Via this connection, coolant is supplied in the arrow direction 17 from the second coolant supply line 257 of the second print head module 200''' into the second coolant supply line 157 of the first print head module 100'''.

The print head 204''' comprises a fourth connector 167 with the aid of which coolant is conveyed from the print head 104''' into a connecting hose 169. The connecting hose 169 is connected with a fourth connector 159 of the first print head module 100''' so that coolant may flow in the arrow direction 19 from the print head 104''' into the coolant supply line 157 via a coolant inlet opening.

A hose fitting 181 is arranged at the seventh opening 163 of the first print head module 100''', in particular is glued or screwed to the base plate 102''', which hose fitting 181 connects the second coolant supply line 157 with an external coolant supply line 25 that connects the print head module 100''' with a coolant supply unit 23. A closed coolant circuit is thus formed in the described fourth exemplary embodiment.

The first coolant supply lines 156, 157 respectively have a smaller clearance from the ink supply lines 106, 206, 107, 207, in a range between 1 mm and 2 cm, preferably between 2 mm and 5 mm. The ink within the print bar 100''', 200''' is thereby tempered such that the ink directed in the ink supply lines 106, 206, 107, 207 exhibits a temperature in a range between 29° C. and 32° C.

FIG. 9 shows a schematic side view of the print bar 40 according to FIG. 8. The ink supply lines 106, 206, 107, 207 travel in the base plates 102''', 202''', respectively parallel to coolant supply lines 156, 157, 256, 257.

FIG. 10 shows a schematic plan view of a print bar 50 having two print head modules 300, 400 according to a fifth embodiment. Elements having the same design or the same function have the same reference characters. The base plates 302, 402 are respectively connected with two print heads 304, 304', 404, 404'. The print head modules 300, 400 also respectively comprise a carrier element 330, 430 that is arranged centrally with respect to the respective print heads 304, 304', 404, 404'. The middle plane M2 of the carrier elements 330, 430 is respectively arranged at a 90° angle to the middle plane M1 of the base plates 302, 402, so that the carrier elements 330, 430, with the base plates 302, 402, form the shape of a T-profile.

The first ink supply lines 106, 206 for supplying ink to the print heads 304, 304', 404, 404', and the second ink supply lines 107, 207 for discharging ink from the print heads, respectively run in cutouts of the carrier elements 330, 430. The supplying of the print heads 304, 304', 404, 404' with ink, and the discharging of in from the print heads 304, 304', 404, 404', take place in the manner described in conjunction with the third embodiment, with the difference that the ink supply lines 106, 206, 107, 207 run in the carrier elements 330, 430 and supply four print heads 304, 304', 404, 404'. In each print head module 300, 400, two respective connectors 108, 108', 208, 208' are thus provided for discharging ink from the ink supply line 106, 206, and two respective connectors 109, 109', 209, 209' are provided for supplying ink into the ink supply line 206, 207. The connectors 108, 108', 208, 208', 109, 109', 209, 209' are connected via connecting hoses 114, 114', 214, 214', 119, 119', 219, 219' with a respective corresponding connector 116, 116, 117, 117', 216, 216', 217, 217' of the print heads 304, 304', 404, 404'.

In an alternative embodiment, the coolant supply lines 156, 157, 256, 257 also run in the carrier elements 330, 430. In a further alternative embodiment, the ink supply lines 106, 206, 107, 207 run in the base plates 302, 402 and the coolant supply lines 156, 157, 256, 257 run in the carrier elements 330, 430. In a further alternative embodiment, the coolant supply lines 156, 157, 256, 257 run in the base plates 302, 402 and the ink supply lines 106, 206, 107, 207 run in the carrier elements 330, 430.

FIG. 11 shows a schematic view of a print bar 50 according to FIG. 10, from below. Elements having the same design or the same function have the same reference characters. The print nozzle regions 120, 120', 220, 220' respectively extend over the entire width B of the print head modules 300, 400. The print nozzles of the print heads 304, 304', 404, 404' of a print head module 300, 400 respectively print the same color. A doubled printing speed is thereby achieved relative to a printing with one print head per print head module. In alternative embodiments, the print heads 304, 304', 404, 404' of a print head module 300, 400 may respectively print different colors. Additional ink supply lines must be correspondingly provided for this.

FIG. 12 shows a schematic view of a print bar 60 having five print head modules 500, 600, 700, 800, 900. Elements having the same design or the same function have the same reference characters. Accommodated in each print head module 500, 600, 700, 800, 900 is a respective print head 504, 604, 704, 804, 904 whose print nozzle region 520, 620, 720, 820, 920 extends over a partial region of the respective base plate 502, 602, 702, 802, 902. The print head modules 500, 600, 700, 800, 900 are connected such that the print head modules 500, 600, 700 are arranged in a first row R1 and the print head modules 800, 900 are arranged in a second row R2. The print nozzle regions 520, 620, 720, 820, 920 are thereby arranged within a row R1, R2, respectively spaced apart from one another. The print nozzle regions 520, 620, 720 of the first row R1 are arranged with an offset from the print nozzle regions 820, 920 of the second row, such that a respective overlap region U1 to U4 is formed in which the print nozzles of two print heads 504, 604, 704, 804, 904.

In an alternative embodiment, retaining elements may be provided for stabilizing the print bar 50, which retaining elements in particular stabilize the border regions of the second row R2.

FIG. 13 shows a seventh embodiment in which the print bar 10 is introduced into a rail S. The print head modules 100, 102 introduced into the rail S may be connected, in particular materially connected, with the rail S.

In further alternative embodiments, more than two print head modules 100 to 100''', 200 to 200''', 300 to 900, in particular five, fifteen, or twenty print head modules 100 to 100''', 200 to 200''', 300 to 900, are connected to a print bar.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST print bar 10, 20, 30, 40, 50
print head module 100, 100', 100'', 100''', 200, 200', 200'', 200''', 300, 400, 500, 600, 700, 800, 900
base plate 102, 102', 102'', 102''', 202, 202', 202'', 202''', 302, 402, 502, 602, 702, 802, 902
print head 104, 104', 104'', 104''', 204, 204', 204'', 204''', 304, 404, 504, 604, 704 804, 904
ink supply line 14, 15, 106, 107, 206, 207
opening 110, 112, 113, 117, 150, 162, 163, 167, 210, 212, 213, 217, 250, 262, 263, 267
hose fitting 111, 151, 181, 221, 223, 271, 273,
hose connection element 215, 265
connecting hose 114, 114', 119, 119', 164, 169, 214, 214', 219, 219', 264, 269,
coolant supply line 24, 25, 156, 157, 256, 257
coolant supply unit 23
connector 108, 109, 109', 108', 116, 116', 117', 158, 166, 167, 208, 208', 209, 209', 216, 216', 217, 217', 209, 258, 266, 267, 259
closure element 213
supply region 122, 222
print nozzle region 120, 220, 520, 620, 720, 820, 920
carrier element 130, 230, 330, 430
arrow direction 16, 17, 18, 19, 21 width B
overlap region U1 to U4
row R1, R2
middle plane M1, M2
angle A
rails S

The invention claimed is:

1. A print bar for an inkjet printing device, comprising:
a first print head module; and
a second print head module, wherein:
each print head module includes:
a base plate with which at least one print head can be connected, and
a first ink supply line running in the base plate and configured to supply ink to the respective print head module, and
each print head module is configured to be connected to the print bar to establish a connection between the first ink supply line of the first print head module and the first ink supply line of the second print head module,
wherein the connection between the first print head module and the second print head module is executed as a material bond, and
wherein the material bond is an adhesive bond or a welded joint.

2. The print bar according to claim 1, wherein each of the first print head module and the second print head module respectively comprise: a second ink supply line running in the base plate and configured to discharge ink from the respective print head module, the respective second in supply lines being configured such that a connection between the second ink supply line of the first print head module and the second ink supply line of the second print head module is established upon connection of the first print head module and the second print head module to the print bar.

3. The print bar according to claim 1, further comprising:
a first coolant supply line configured to supply coolant to the respective print head respectively runs in the base plate of the first print head module and in the base plate of the second print head module; and
a second coolant supply line configured to discharge coolant from the respective print head respectively runs in the base plate of the first print head module and in the base plate of the second print head module,
wherein, upon connection of the first print head module and the second print head module to the print bar, a connection is established between the first coolant supply line of the first print head module and the first coolant supply line of the second print head module, and between the second coolant supply line of the first print head module and the second coolant supply line of the second print head module.

4. The print bar according to claim 3, wherein:
the first coolant supply line and the first ink supply line are configured to run in parallel, and/or
the second coolant supply line and the second ink supply line are configured to run in parallel.

5. The print bar according to claim 4, wherein ink conducted in the ink supply lines is tempered using coolant conducted in the coolant supply lines such that the ink conducted in the ink supply lines exhibits a temperature in a range between 29° C. and 32° C.

6. The print bar according to claim 1, wherein the first print head module comprises a first carrier element and the second print head module comprises a second carrier element.

7. The print bar according to claim 1, wherein each of the first and second print head modules comprise at least one connector configured to connect the respective first ink supply line and/or the respective first coolant supply line with the print head.

8. The print bar according to claim 7, wherein the at least one connector is a hose.

9. The print bar according to claim 1, wherein the base plate of each print head module comprises a mount configured to accommodate the respective print head.

10. The print bar according to claim 1, wherein the first print head module and the second print head module is configured to accommodate a respective print head, print nozzle regions of the two accommodated print heads adjoin each another.

11. The print bar according to claim 1, wherein at least two respective print heads can be accommodated in the first print head module and in the second print head module, the first and second print head modules being arranged in a first row and in a second row in the print bar, and print nozzle regions of the at least two print heads within a row adjoining each another.

12. The print bar according to claim 1, wherein:
the first and second print head modules are arranged in a first row and in a second row of the print bar,
the print heads within a row are arranged spaced apart from one another, and
the print heads of the first row are arranged with an offset from the print heads of the second row, such that a respective overlap region is formed, print nozzles of two print heads being arranged in an overlap region.

13. The print bar according to claim 1, wherein the inkjet printing device comprises one or more additional print head modules.

14. A print bar for an inkjet printing device, comprising:
a first print head module including a first base plate and a first carrier element; and
a second print head module including a second base plate and a second carrier element, wherein:
the first and second base plates can respectively be connected with at least one print head,
the first print head module further includes a first ink supply line configured to supply ink to the print head connected with the first base plate, the first ink supply line running in the first carrier element,
the second print head module includes a second ink supply line configured to supply ink to the print head connected with the second base plate, the second ink supply line running in the second carrier element, and
the first print head module and the second print head module are configured to be connected to the print bar to establish a connection between the first ink supply line of the first print head module and the second ink supply line of the second print head module, wherein:
the print heads are connected with the respective first and second base plates such that a print nozzle region of the print heads is arranged on a first side of the respective first and second base plates, and
the respective first and second carrier elements are connected with the first and second base plates such that the first and second carrier elements are arranged on an a second side of the respective first and second base plates opposite the first side.

15. The print bar for an inkjet printing device according to claim 14, wherein:

at least one first coolant supply line configured to supply coolant to the respective print head respectively runs in the first carrier element and in the second carrier element, at least one second coolant supply line configured to discharge coolant from the respective print head respectively runs in the first carrier element and in the second carrier element, a connection between the first coolant supply line of the first print head module and the first coolant supply line of the second print head module is established upon connection of the first print head module and the second print head module to the print bar, and a connection between the second coolant supply line of the first print head module and the second coolant supply line of the second print head module is established upon connection of the first print head module and the second print head module to the print bar.

* * * * *